(12) United States Patent
Makishima et al.

(10) Patent No.: US 6,549,307 B1
(45) Date of Patent: Apr. 15, 2003

(54) ELECTRONIC CENTER

(75) Inventors: Sugio Makishima, Saitama-ken (JP); Hiroshi Tanaka, Saitama-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/219,357

(22) Filed: Dec. 23, 1998

(30) Foreign Application Priority Data

Dec. 25, 1997 (JP) .............................................. 9-358138

(51) Int. Cl.⁷ .............................................. H04N 5/225
(52) U.S. Cl. ................ 358/909.1; 386/107; 348/333.11
(58) Field of Search .......................... 386/46, 95, 107, 386/117; 358/906, 909.1; 348/231, 232, 333.06, 333.11, 333.12, 64; 355/35; 396/429

(56) References Cited

U.S. PATENT DOCUMENTS

| | | | | |
|---|---|---|---|---|
| 4,541,010 A | * | 9/1985 | Alston | 358/906 |
| 4,714,962 A | * | 12/1987 | Levine | 348/64 |
| 4,876,590 A | * | 10/1989 | Parulski | 348/333.11 |
| 5,784,149 A | * | 7/1998 | Kawaoka | 355/35 |
| 5,845,166 A | * | 12/1998 | Fellegara et al. | 396/429 |
| 5,917,548 A | * | 6/1999 | McIntyre | 348/333.06 |
| 6,192,184 B1 | * | 2/2001 | Shiota et al. | 386/52 |

* cited by examiner

*Primary Examiner*—Huy Nguyen
(74) *Attorney, Agent, or Firm*—Birch, Stewart, Kolasch & Birch, LLP

(57) ABSTRACT

An image photographed by an electronic camera can be recorded in a recording medium in an optimal recording mode such that the quality needed is maintained and the space of the recording medium is used efficiently. Image data obtained by photographing are displayed on a monitor attached to the camera before being recorded in the recording medium so that a user can set the recording mode for the image being displayed. A resolution or compression rate can be specified directly in the setting of the recording mode. Alternatively, a recording mode corresponding to usage of an image (a printing mode, for example) is selected and the electronic camera automatically sets the recording mode optimal for the usage. After the setting, the image data are converted according to the recording mode having been set, and recorded in the recording medium.

5 Claims, 3 Drawing Sheets

ELECTRONIC CENTER

BACKGROUND OF THE INVENTION

1. Field of the Invention

The present invention relates to an electronic camera for recording images in a plurality of recording modes.

2. Description of the Related Art

For an electronic camera which records photographed images as digital data in a memory, the number of photographs it can record depends on the capacity of the memory. Especially, for an electronic camera having a built-in memory, when the memory thereof becomes full, subsequent photographing cannot be carried out unless image data stored therein are transferred to a personal computer or the like. Therefore, many digital cameras have a function to switch image recording modes according to a purpose of photographing so that their memories can be used as efficiently as possible. More specifically, many cameras have plural kinds of recording modes such as a high quality (high resolution) mode or a compression mode, according to the resolution or necessity of compression of an image.

For a conventional electronic camera, such a recording mode needs to be set before photographing, and for image data having been recorded in a memory, the recording mode cannot be changed. However, in many cases the purpose of photographing (usage of images) is not obvious at the time of photographing.

For example, in order to print a photographed image, the image needs to be recorded in a high quality (high resolution) mode. However, whether or not an image is printed has not necessarily been decided before photographing the image, and it is often decided after checking how the image has come out is checked. In such a case, since all images can be candidates for printing, the recording mode should be set to the high quality mode for all images at the time of photographing. Therefore, many users record even images having compression-mode quality (which are not printed) in the high quality mode. In other words, the image recording function of a conventional electronic camera using a plurality of recording modes has not necessarily been utilized effectively.

SUMMARY OF THE INVENTION

Based on consideration of the above problems, an object of the present invention is to provide an electronic camera which can record data of all images in a recording mode appropriate for each image and effectively utilize its memory having a limited capacity.

In order to solve the above problems, the present invention adds a function for setting a recording mode during preview of an image in an electronic camera comprising a preview photographing function to display on a monitor data of the photographed image before they are recorded in a recording medium.

In other words, the electronic camera of the present invention comprises temporary storage means, such as a frame memory, for temporarily storing image data obtained by photographing, image displaying means for displaying the image data being temporarily stored as a visible image on a display medium, recording mode deciding means for deciding, based on predetermined information input externally, a mode of recording the image data being displayed, image converting means for converting the image data temporarily stored to image data in a recording mode determined by the recording mode deciding means, and image recording means for recording the image data after the conversion in a predetermined recording medium.

The "image displaying means" displays image data which have been transferred from image photographing means and stored temporarily in the frame memory, that is, the image data before being recorded in a memory card or the like. The image displaying means is different from means for replaying image data recorded in the memory card or the like. However, the electronic camera of the present invention may comprise a function to replay image data having been recorded, separately from the image displaying means.

As the "predetermined information", information directly specifying the content of conversion processing to be carried out on the image data, or information specifying usage of image data, or the like can be used.

The information directly specifying the content of conversion processing may include information indicating whether or not compression, a resolution conversion, a tone conversion, and trimming is necessary, as well as a compression rate, resolution, tones, and an area to be trimmed if each kind of processing is necessary, for example. A user can select these kinds of information, such as the compression or resolution conversion, from a menu showing each option displayed on a monitor attached to the camera, by operating a button of the camera. The user selects from a plurality of available compression rates displayed on the monitor (or inputs a value), in the case of compression for example. In this manner, the selected item can be input.

The information specifying usage means information indicating whether an image has been photographed for printing or for display only, for example. Such information can be input by causing the user to select a recording mode such as a "printing mode" or a "display mode" predefined according to the usage and displayed on the monitor of the camera. In this case, the recording mode deciding means automatically judges an appropriate compression rate, resolution, tone, or the like for printing if the printing mode has been selected. Likewise, the recording mode deciding means automatically judges the same items in the above for display if the display mode has been selected. In this case, the image converting means carries out compression or resolution conversion processing on the image data for example, based on the compression rate or the resolution having been judged automatically.

When the printing mode has been selected, it is expected that the user will specify the quantity or the like of printing, after setting the recording mode. Therefore, t he camera may comprise a function to record the printing specifying information together with the image data in the recording medium. In this case, the screen automatically shifts to a printing specification screen when the printing mode has been selected. The printing specifying information regarding print output is input on this screen.

As the "predetermined recording medium", a memory installed in an electronic camera or a removable medium detachable from a camera can be used. As the removable medium, a memory card such as an SSFDC, a Compact Flash, or a PC card, or a magnetic (or a magneto-optic) recording medium such as an FD or a Picture MD may be used.

According to the electronic camera of the present invention, a user can set the recording mode while previewing an image having been photographed. Therefore, image data can be recorded in an optimal recording mode decided by confirming the image. In this manner, unlike a conventional electronic camera which needs recording mode setting to be carried out before photographing, memory shortage due to unsuccessfully photographed images recorded at a high resolution, or poor quality for printing due to recording at a low resolution does not occur.

At this time, an image can be recorded in the recording mode according to the user's intention when the content of the conversion processing to be carried out on image data can be specified directly, such as in the case where the image data are recorded by using a desired resolution or compression rate having been set by the user.

Meanwhile, if a user inputs the usage of image data such as the "printing mode" and the digital camera judges an optimal resolution or compression rate according to the usage in order to record the image data in the recording mode, a user who does not have detailed knowledge of digital processing (or a user who is not familiar with the terms such as resolution and compression rate) can record image data in an optimal recording mode.

Furthermore, since it is expected that a user will input printing specifying information such as quantity after setting the recording mode if the printing mode has been selected, convenience of the electronic camera is improved by linking the function of recording mode setting with that of printing specification, such as in the case where a printing specifying information input screen is displayed after printing mode has been selected by the user.

DESCRIPTION OF THE PREFERRED EMBODIMENT

Figure 1:
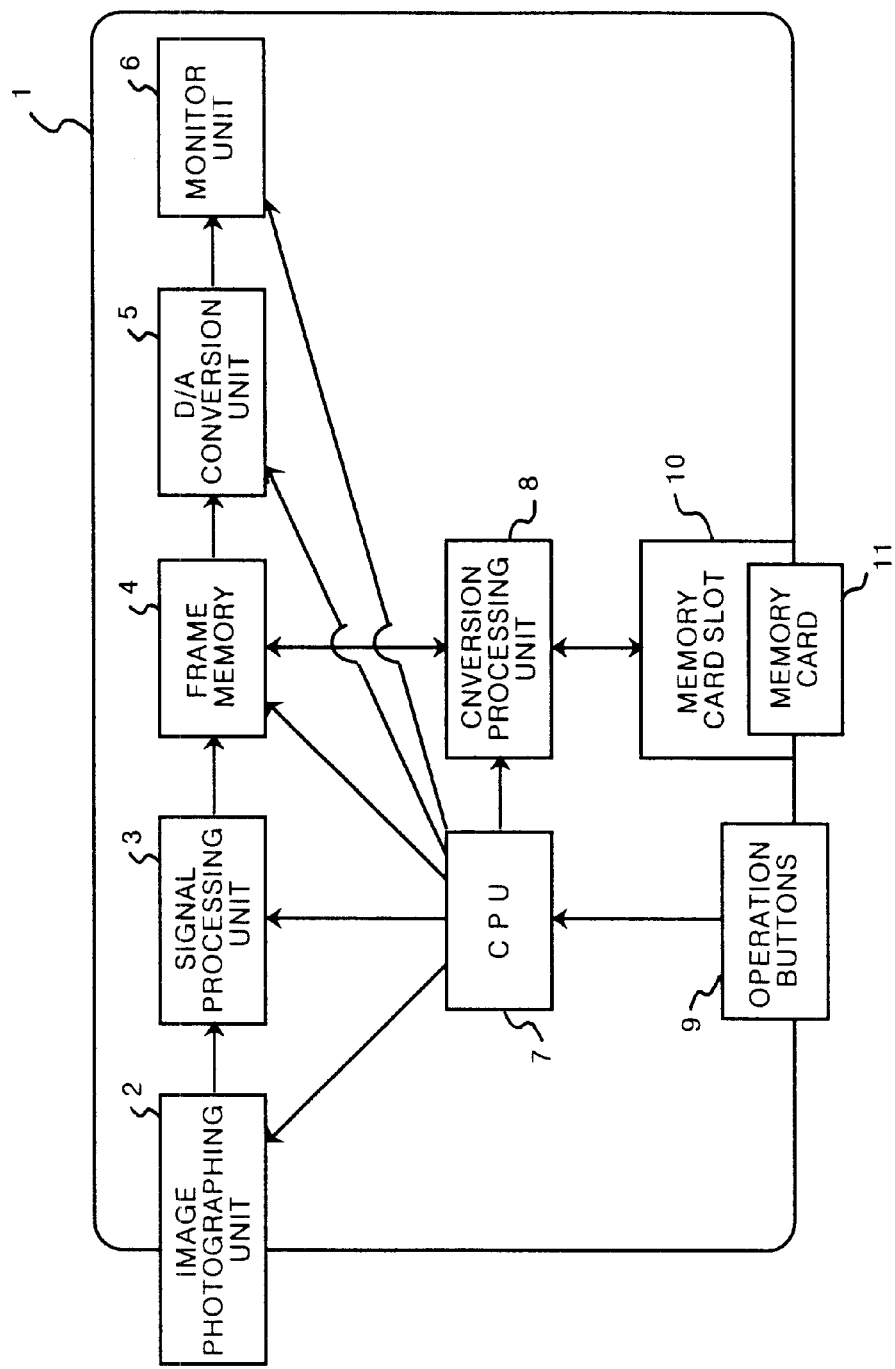
FIG. 1 is a block diagram showing an example of an internal configuration of an electronic camera of the present invention.

Hereinafter, an embodiment of an electronic camera of the present invention will be explained with reference to the accompanying drawings. FIG. 1 is a block diagram showing an internal configuration of the electronic camera in this embodiment. As shown in FIG. 1, an electronic camera 1 comprises an image photographing unit 2 which obtains image data by photographing an object, a signal processing unit 3 which carries out tone processing or the like on the image data obtained by the image photographing unit 2, a frame memory 4 which temporarily stores image data processed by the signal processing unit 3, a D/A conversion unit 5 which converts the image data in the frame memory 4 to a video signal, a monitor unit 6 which displays the video signal, a conversion processing unit 8 which carries out resolution conversion or compression processing on the image data stored in the frame memory 4, a memory card 11 wherein the image data converted by the conversion processing unit 8 are recorded, a memory card slot 10 for installing the memory card in the digital camera 1, a group of operation buttons 9 such as a shutter button or a frame advancing/retreating button (+/− button), and a CPU 7 which controls, according to a program stored in a memory which is not shown in FIG. 1, the image photographing unit 2, the signal processing unit 3, the frame memory 4, the D/A conversion unit 5, the monitor unit 6, and the conversion processing unit 8, in response to various kinds of instruction signals input from the operation buttons.

The electronic camera 1 in the above realizes 5 functions. In a normal photographing mode, image data obtained by photographing are recorded in the memory card 11 as they are. In a preview photographing mode,; an image is displayed on the monitor unit 6 immediately after photographing thereof, and the image is recorded in the memory card 11 or canceled without being recorded, in response to an instruction by a user. In a one-frame replay mode, images recorded in the memory card 11 are displayed on the monitor one by one. In an index replay mode, images recorded in the memory card 11 are displayed in blocks of several frames. In an erasing mode, an image frame selected from the images in the memory card 11 or all images therein are erased and the memory card is formatted if necessary.

Figure 2:
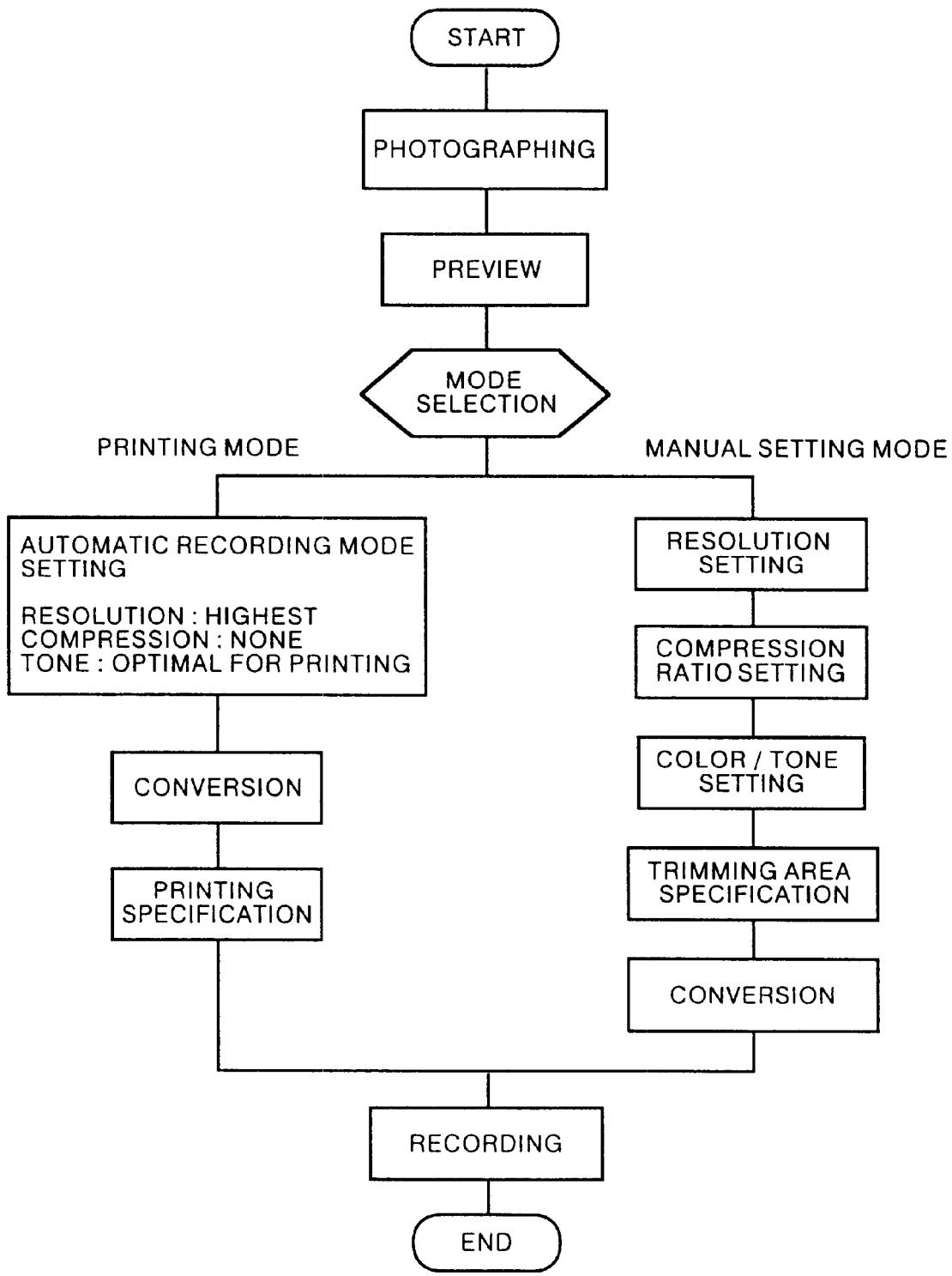
FIG. 2 is a flow chart showing processing from photographing to recording of an image in a preview photographing mode.

Among the above-described 5 functions, a mode of recording can be set by using the present invention in the preview photographing mode. FIG. 2 is a flow chart showing processing flow from photographing to recording of an image in the preview photographing mode. The CPU 7 instructs the timing of photographing to the image photographing unit 2 according to an operation of the shutter button carried out by the user. In this manner, image photographing is carried out. Image data obtained by the photographing are stored temporarily in the frame memory 4 via the signal processing unit 3, as has been described in the above. The image data are then displayed on the monitor unit 6 via the D/A conversion unit 5. A preview screen in this state is shown in FIG. 2. At this time, the image data are not recorded in the memory card 11.

Figure 3:
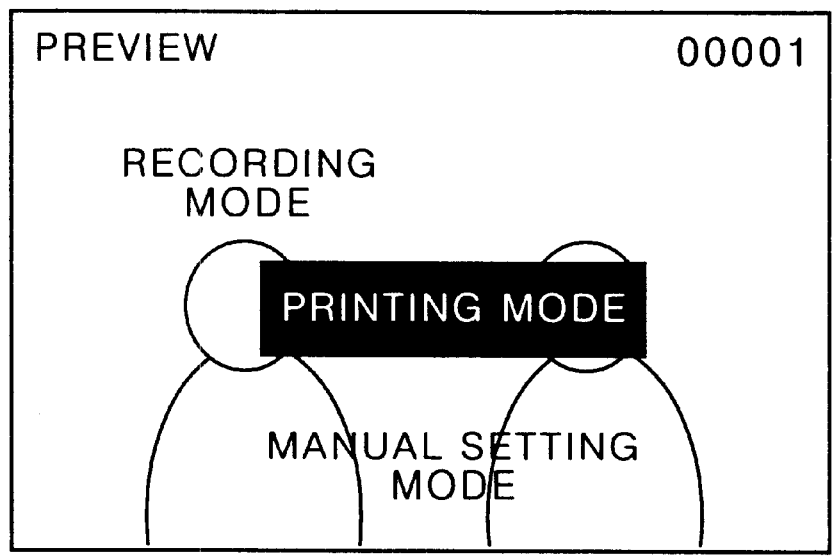
FIG. 3 is a diagram showing an example of a recording mode selection screen.

The CPU 7 then displays a menu for selecting a recording mode on the monitor unit 6. In this embodiment, the menu for selecting the recording mode is shown over the image being previewed, as shown in FIG. 3. The user can select either a printing mode or a manual setting mode. The user can change the display of the choice showing either mode into reverse video by operating the frame advancing/retreating button. With the selected choice being displayed in reverse video, the user presses the shutter button. The mode of the choice being displayed in reverse video is then determined as the recording mode. The manner in which each item is selected from the menu is not limited to the above example. Depending on the type of an electronic camera or the kind and the number of buttons thereof, various selection methods are possible.

In the example shown in FIG. 3, the printing mode is the mode wherein the recording mode appropriate for print output is automatically judged by the electronic camera. On the other hand, in the manual setting mode, the user specifies each item of the recording mode, such as the resolution, a compression rate, or the like used in recording, and the electronic camera records the image data according to the specification.

The case where the printing mode has been selected will be explained first. As shown in the flow chart in FIG. 2, when the printing mode has been selected, the recording mode is set automatically by the electronic camera. In this case, the recording mode to be set automatically has been pre-stored in the electronic camera, as a recording mode optimal for print output. More specifically, a highest resolution, non-compression, and optimal tones for printing are set as the recording mode. The CPU 7 instructs conversion of the image data to the conversion processing unit 8 according to the content of the above-described setting. Since no resolution conversion or compression processing is necessary in this case, the conversion processing unit 8 carries out only the optimal tone processing on the image data stored in the frame memory 4. The manner of this optimization is not specifically limited in the present invention.

Figure 4:
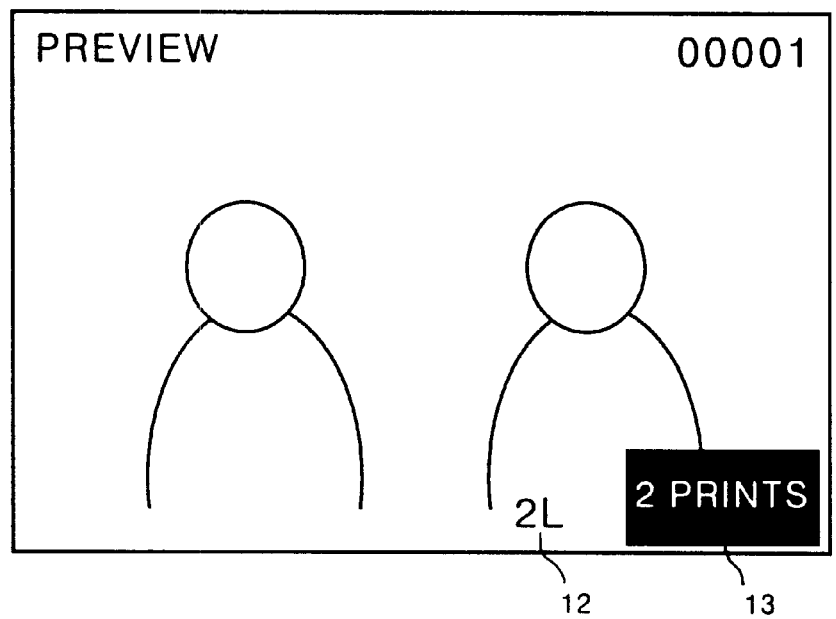
FIG. 4 is a diagram showing an example of a printing specification screen.

When the printing mode has been selected in this embodiment, a printing specification screen as shown in FIG. 4 is displayed on the monitor. In this printing specification screen, print size display 12 and print quantity display 13 in the lower right corner of the screen are changed by an operation of the frame advancing button carried out by the user. The print size and quantity are then confirmed by an operation of the shutter button. The printing specifying information such as the print size and quantity having been confirmed is recorded in the memory card 11, together with the image data having been converted by the conversion processing unit 8.

The case where the manual setting mode has been selected will be explained next. As shown in the flow chart shown in FIG. 2, a resolution setting screen similar to the mode selection screen shown in FIG. 3 is displayed on the monitor in the manual setting mode. On this screen, the user can select either a highest resolution or a standard resolution. After the resolution selection, 3 choices, namely non-compression, low compression, and high compression, are displayed as a compression rate setting screen. The user can select one of them. However, the value for the resolution or the compression rate may be set by the user. In other words, as in the case of print quantity setting shown in FIG. 4, the value showing the resolution or compression rate may be changed and set by an operation of the frame advancing button carried out by the user.

In this embodiment, following the resolution or compression rate setting, color or tone specification can be carried out. For example, as for tones, choices such as 16, 256, and 65536 colors may be displayed as menu items so that the user can select one of them.

Furthermore, trimming may be carried out on the preview screen so that only the area after trimming is recorded. In this case, a frame indicating the area to be removed is displayed together with the image on the monitor. The user can change the position or the size of the frame by a predetermined button operation, and the area to be removed can be set by the user subsequently pressing the shutter button.

The CPU 7 instructs to the conversion processing unit 8 a conversion of the image data according to the content of the setting. When the area to be removed has been specified, the conversion processing unit 8 trims the area off the image data stored in the frame memory 4 and changes the resolution of the image data representing the area after trimming to the specified one, by carrying out filtering processing or the like on the image data after trimming. Furthermore, the image data after the resolution conversion are tone-converted and represented by the number of bits corresponding to the specified tone (4 bits per pixel in 16 tones, 8 bits in 256 tones). The image data are then compressed according to a compression format such as JPEG. However, the order of the above processing is not limited to the above-described example. The image data having been converted by the conversion processing unit 8 are then recorded in the memory card 11.

As has been described above, according to the electronic camera of the present invention, the recording mode can be set for an image being previewed in the preview photographing mode. Therefore, if photographing is successful, an image is recorded in the printing mode, while it is recorded at a low resolution and a high compression rate if unsuccessful, for example. In this manner, image data can be recorded in an optimal recording mode judged by the result of the preview. As a result, the memory can be used efficiently and no image quality will be problematic after photographing.

What is claimed is:

1. An electronic camera comprising:

temporary storage for temporarily storing image data obtained by photographing;

image display for displaying the image data temporarily stored as a visible image on a display medium;

recording format deciding means for deciding, based on predetermined information input externally, a format of recording the image data being displayed, said format of recording includes a resolution setting, a compression ratio setting, a color/tone setting and a trimming area specification, wherein a user selects the desired format from review of said visible image displayed on said display medium, the selected desired format is input externally, through a selector on said electronic camera, as said predetermined information;

image converter, responsive to said recording format deciding means, for formatting the image data temporarily stored to image data to the recording format determined by the recording format deciding means, to vary the format of the image obtained from the image data output therefrom; and image recorder for electronically recording the image data after formatting in a predetermined recording medium within said electronic camera.

2. An electronic camera as claimed in claim 1, wherein the predetermined information directly specifies the content of a conversion processing to be carried out on the image data.

3. An electronic camera as claimed in claim 1, wherein the predetermined information specifies usage of the image data; and the recording mode deciding means judges a recording mode appropriate for the usage and: the recording mode becomes the mode in which the image data being displayed are recorded.

4. An electronic camera as claimed in claim 3, wherein the recording mode deciding means judges a recording mode optimal for print output when the predetermined information shows that usage of the image data is to output a print thereof, and the recording mode becomes the mode of recording the image data being displayed.

5. An electronic camera as claimed in claim 4, further comprising printing specifying means which receives printing specifying information regarding print output of the image data when the predetermined information shows that the usage of the image data is to output a print thereof, and records the printing specifying information in the recording medium together with the image data.

* * * * *